United States Patent
Williams et al.

(10) Patent No.: US 12,403,629 B2
(45) Date of Patent: Sep. 2, 2025

(54) RECYCLABLE SINGLE POLYMER FLOORCOVERING ARTICLE

(71) Applicant: Milliken & Company, Spartanburg, SC (US)

(72) Inventors: Dale R. Williams, Greer, SC (US); Joseph Wallen, LaGrange, GA (US); Ty Grant Dawson, Spartanburg, SC (US); Nils David Sellman, Jr., LaGrange, GA (US); Daniel Taylor McBride, Chesnee, SC (US); Joseph R. Royer, Simpsonville, SC (US); John L. Sanchez, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 21 days.

(21) Appl. No.: 18/529,359

(22) Filed: Dec. 5, 2023

(65) Prior Publication Data

US 2024/0100738 A1    Mar. 28, 2024

Related U.S. Application Data

(60) Continuation of application No. 18/133,585, filed on Apr. 12, 2023, now Pat. No. 11,883,984, which is a continuation of application No. 17/353,941, filed on Jun. 22, 2021, now Pat. No. 11,673,291, which is a division of application No. 16/561,158, filed on Sep. 5, 2019, now Pat. No. 11,084,186, which is a division of application No. 15/002,468, filed on Jan. 21, 2016, now abandoned, which is a continuation of application No. 14/201,996, filed on Mar. 10, 2014, now abandoned.

(60) Provisional application No. 61/777,028, filed on Mar. 12, 2013.

(51) Int. Cl.
| | |
|---|---|
| C08J 11/10 | (2006.01) |
| A47G 27/02 | (2006.01) |
| B29B 9/06 | (2006.01) |
| B29B 9/12 | (2006.01) |
| B29B 17/00 | (2006.01) |
| C08J 11/12 | (2006.01) |
| D06N 7/00 | (2006.01) |
| B29K 67/00 | (2006.01) |
| B29K 105/26 | (2006.01) |

(52) U.S. Cl.
CPC ............... *B29B 9/12* (2013.01); *A47G 27/02* (2013.01); *B29B 9/06* (2013.01); *B29B 17/0036* (2013.01); *C08J 11/10* (2013.01); *C08J 11/12* (2013.01); *D06N 7/0065* (2013.01); *D06N 7/0068* (2013.01); *D06N 7/0076* (2013.01); *D06N 7/0081* (2013.01); B29K 2067/00 (2013.01); B29K 2105/26 (2013.01); C08J 2367/02 (2013.01); D06N 2203/061 (2013.01); D06N 2213/02 (2013.01); D06N 2213/065 (2013.01); Y10T 428/23979 (2015.04)

(58) Field of Classification Search
USPC .......................................................... 264/101
See application file for complete search history.

(56) References Cited

U.S. PATENT DOCUMENTS

| | | | |
|---|---|---|---|
| 3,684,600 | A | 8/1972 | Smedberg |
| 3,821,066 | A | 6/1974 | Tillotson |
| 4,165,420 | A | 8/1979 | Rinehart |
| 4,371,576 | A | 2/1983 | Machell |
| 4,439,476 | A | 3/1984 | Guild |
| 4,844,765 | A | 7/1989 | Reith |
| 4,968,463 | A | 11/1990 | Levasseur |
| 5,009,586 | A | 4/1991 | Pallmann |
| 5,169,870 | A | 12/1992 | Corbin |
| 5,240,530 | A | 8/1993 | Fink |
| 5,370,757 | A | 12/1994 | Corbin |
| 5,464,677 | A | 11/1995 | Corbin |
| 5,472,763 | A | 12/1995 | Schwarz |
| 5,494,723 | A | 2/1996 | Erren |
| 5,538,776 | A | 7/1996 | Corbin |
| 5,604,009 | A | 2/1997 | Long |
| 5,630,896 | A | 5/1997 | Corbin |
| 5,876,644 | A | 3/1999 | Nichols |
| 5,902,663 | A | 5/1999 | Justesen |
| 6,051,300 | A | 4/2000 | Fink |
| 6,060,145 | A | 5/2000 | Smith |

(Continued)

FOREIGN PATENT DOCUMENTS

| | | |
|---|---|---|
| CN | 1132533 | 10/1996 |
| CN | 101144191 A | 3/2008 |

(Continued)

OTHER PUBLICATIONS

Ademola Bolanle Raheem et al. "Current developments in Chemical recycling of post-consumerpolyethylene terephthalate wastes fornew materials production" A review; Journal of Cleaner Production 225 (2019) pp. 1052-1064 (Year: 2019).

(Continued)

*Primary Examiner* — Terressa Boykin

(74) *Attorney, Agent, or Firm* — Brenda D. Amidon

(57) ABSTRACT

This invention relates to tufted floorcovering articles, including carpet tiles and broadloom carpet. In particular, this invention relates to tufted floorcovering articles made from the family of polymers known as polyester. Specifically, this invention relates to tufted carpet tile products made from polyester. The polyester carpet tiles meet commercial performance specifications and are fully end-of-life recyclable.

7 Claims, 1 Drawing Sheet

(56) References Cited

U.S. PATENT DOCUMENTS

| | | |
|---|---|---|
| 6,398,891 B1 | 6/2002 | Corbin |
| 6,503,595 B1 | 1/2003 | Kim |
| 6,687,532 B2 | 2/2004 | Ohmae |
| 6,740,386 B2 | 5/2004 | Hutchison |
| 6,849,565 B1 | 2/2005 | Gardner |
| 7,635,099 B1 | 12/2009 | Meredith |
| 7,678,159 B1 | 3/2010 | Weiner |
| 7,846,214 B1 | 12/2010 | Weiner |
| 2003/0161990 A1 | 8/2003 | Higgins |
| 2003/0170420 A1 | 9/2003 | Higgins |
| 2004/0001934 A1 | 1/2004 | Young |
| 2004/0219247 A1 | 11/2004 | Bacher |
| 2005/0260913 A1 | 11/2005 | Doesburg |
| 2006/0006564 A1 | 1/2006 | Maldas |
| 2006/0074136 A1 | 4/2006 | Smith |
| 2006/0257616 A1 | 11/2006 | Hendrix |
| 2007/0254131 A1 | 11/2007 | Shail |
| 2008/0194713 A1 | 8/2008 | Kim |
| 2008/0292831 A1 | 11/2008 | Juriga |
| 2009/0082476 A1 | 3/2009 | Hoover, Jr. |
| 2011/0177283 A1 | 7/2011 | Juriga |
| 2012/0082820 A1 | 4/2012 | Salsman |
| 2015/0118437 A1 | 4/2015 | Schulze |
| 2020/0157307 A1 | 5/2020 | Guo |

FOREIGN PATENT DOCUMENTS

| | | | |
|---|---|---|---|
| CN | 101487142 A | 7/2009 | |
| CN | 101550609 A | 10/2009 | |
| CN | 101935895 A | 1/2011 | |
| CN | 202116476 U | 1/2012 | |
| CN | 102605454 A | 7/2012 | |
| CN | 102746498 A | 10/2012 | |
| CN | 102864516 A | 1/2013 | |
| DE | 3842072 C1 | 12/1989 | |
| EP | 0590189 A1 | 4/1994 | |
| EP | 0596457 | 5/1994 | |
| EP | 0599101 A1 | 6/1994 | |
| EP | 0604897 A1 * | 7/1994 | ............. D04H 11/08 |
| EP | 0625605 A1 | 11/1994 | |
| EP | 0547533 B1 | 3/1996 | |
| EP | 1091038 | 4/2001 | |
| EP | 1598476 B1 | 7/2012 | |
| EP | 2087166 B1 * | 7/2012 | ............. B29B 17/02 |
| FR | 1484805 | 6/1967 | |
| GB | 1259335 | 1/1972 | |
| GB | 2361739 | 10/2001 | |
| JP | H0768808 A | 3/1995 | |
| JP | H085141 | 1/1996 | |
| JP | H08224158 | 9/1996 | |
| JP | 2001172856 | 6/2001 | |
| JP | 7068724 | 5/2022 | |
| WO | 9312285 A1 | 6/1993 | |
| WO | 9521213 | 8/1995 | |
| WO | 2001023181 A1 | 4/2001 | |
| WO | 2001045942 A1 | 6/2001 | |
| WO | 03106751 A1 | 12/2003 | |
| WO | 2006041753 A2 | 4/2006 | |
| WO | 2006135809 A2 | 12/2006 | |
| WO | 2010133531 A1 | 11/2010 | |
| WO | 2012045068 A1 | 4/2012 | |
| WO | 2012076348 A2 | 6/2012 | |
| WO | 2013167408 A1 | 11/2013 | |

OTHER PUBLICATIONS

Carpet America Recovery Effort, Apr. 23, 2012, 2011 CARE Annual Report, Carpetrecovery.org, Retrieved Jan. 18, 2013. www.carpetrecovery.org. 52 pages.

Complete Textile Glossary, Celanese Acetate, 2001, definitions of "piain weave" and "twill weave" and illustrations thereof. (Year: 2001) 7 pages.

DE 3842072C1 Machine Translation Regulating Thermoplastic Waste Includes Agglomerator With 3 Supply Unit Which Joins on Plate Shaped Annular Space. (Year: 1989) 5 pages.

International Search Report. International Application No. PCT/US2014/023184; International Filing Date: Mar. 11, 2014, 6 pages.

JP-2006072223-A Murata Kazuya Mar. 16, 2006 (year 2006) 11 pages.

Kuczenski, Brandon and Roland Geyer. Material Flow Analysis of Polyethylene Terephthalate in the US, Resources, Conversation and Recycling, 54 (2010) 1161-1169.

* cited by examiner

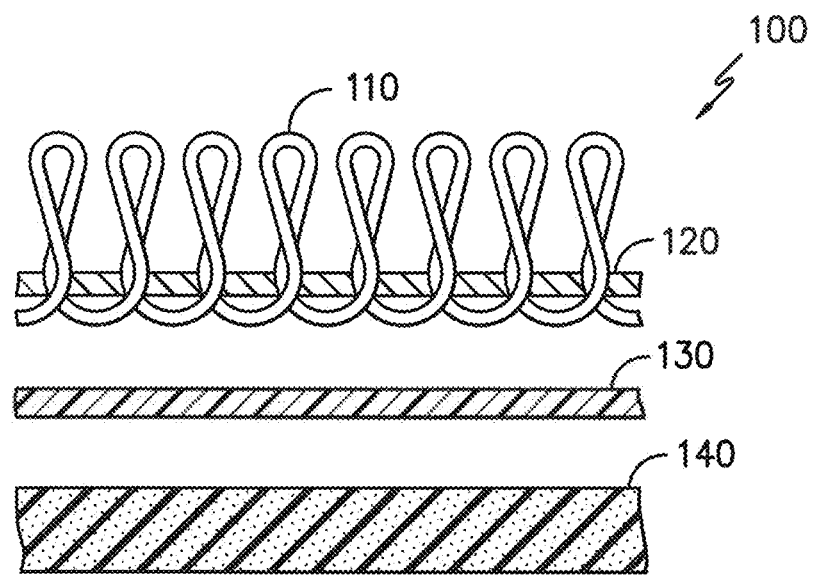
FIG. -1-
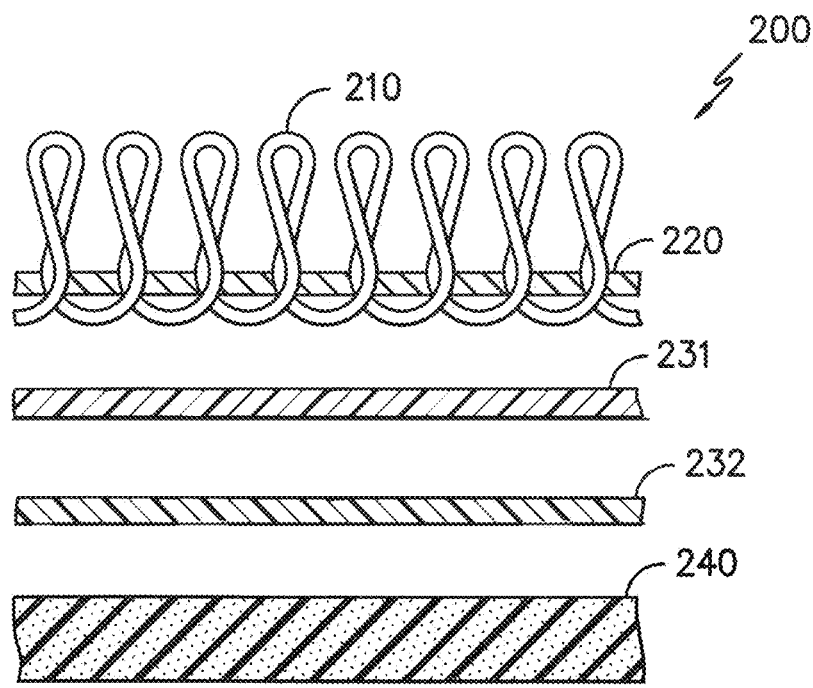
FIG. -2-

RECYCLABLE SINGLE POLYMER FLOORCOVERING ARTICLE

CROSS-REFERENCE TO RELATED APPLICATIONS

This application claims priority to and is a continuation of U.S. patent application Ser. No. 18/133,585, filed Apr. 12, 2023, entitled "Recyclable Single Polymer Floorcovering Article," which claims priority to and is a continuation of U.S. patent application Ser. No. 17/353,941, filed Jun. 22, 2021, entitled "Recyclable Single Polymer Floorcovering Article," which claims priority to and is a divisional of U.S. patent application Ser. No. 16/561,158, filed Sep. 5, 2019, entitled "Recyclable Single Polymer Floorcovering Article," which claims priority to and is a divisional of and U.S. patent application Ser. No. 15/002,468, filed Jan. 21, 2016, entitled "Recyclable Single Polymer Floorcovering Article," which claims priority to and is a continuation of U.S. patent application Ser. No. 14/201,996 filed Mar. 10, 2014, entitled "Recyclable Single Polymer Floorcovering Article," which claims priority to U.S. Patent Application Ser. No. 61/777,028, entitled "Recyclable Single Polymer Floorcovering Article," which was filed on Mar. 12, 2013, all of which are entirely incorporated by reference herein.

TECHNICAL FIELD

This invention relates to tufted floorcovering articles, including carpet tiles and broadloom carpet. In particular, this invention relates to tufted floorcovering articles made from the family of polymers known as polyester. Specifically, this invention relates to tufted carpet tile products made from polyester. The polyester carpet tiles meet commercial performance specifications and are fully end-of-life recyclable.

BACKGROUND

The end-of-life option for the majority of tufted floorcovering articles, such as carpet, is landfill disposal. In their 2011 Annual Report, Carpet America Recovery Effort (CARE) reported that 91% of the removed carpet was sent to landfill. The complexity of the carpet, including multiple incompatible layers comprised of various materials, limits recycling and end-of-life options. Because landfill space is limited in quantity and expensive to utilize, with costs continuing to rise, the disposal of carpets in landfills is not acceptable. Thus, there is a need in the industry for the development of tufted floorcovering articles which are substantially 100% recyclable and eliminate the landfill disposal problem.

Tufted carpet typically consists of a face yarn (staple or continuous fibers) tufted into a primary backing. The yarn provides the appearance or aesthetics of the carpet. The primary backing can be either a woven, nonwoven or knitted product which supports the tufts. The tufts are secured to the primary backing using a precoat adhesive, which is typically latex based. Most commonly used latexes are usually SBR (styrene-butadiene) or EVA (ethylene vinyl acetate) based. Some VAE (vinyl acetate ethylene if vinyl acetate component is greater than 60%) is also utilized, but not as common. Some manufacturers of PVC (polyvinyl chloride) backed tiles sometimes use a diluted form of PVC that contains additional amounts of plasticizers to further reduce viscosity properties. All of these types of precoats are usually filled with inorganic particles such as $CaCO_3$, $BaSO_4$, coal fly ash, or recycled glass cullet in an effort to reduce cost, improve tuft bind strength, and sometime for additional recycled content. However, these fillers typically create a serious problem for downstream recycling.

The precoat adhesive secures the tufts and prevents the tufts from pulling free of the primary backing (Tuft Bind of Pile Yarn in Floor Coverings ASTM D1335). The precoat adhesive also provides pill and fuzz resistance (Velcro Roller Fuzzing Test ITTS 112). A back coating of PVC, bitumen, modified bitumen, EVA, VAE, or polyolefin is applied along with a fiberglass layer. The back coating provides a moisture barrier and, along with the fiberglass layer, provides dimensional stability to the carpet tile. In some cases, a polyurethane foam and/or nonwoven underlayer is applied to the back of the carpet. This underlayer provides for underfoot comfort and absorbs impact, which allows the carpet to look newer longer.

The performance requirements for commercial carpet include a mixture of well documented standard tests and industry known tests. Resistance to Delamination of the Secondary Backing of Pile Yarn Floor Covering (ASTM D3936), Tuft Bind of Pile Yarn Floor Coverings (ASTM D1335), and the Aachen dimensional stability test (ISO 2551) are performance tests referenced by several organizations (e.g. General Services Administration). Achieving Resistance to Delamination values greater than 2 pounds is desirable, and greater than 2.5 pounds even more desirable. Achieving Tuft Bind values greater than 8 pounds is desirable, and greater than 10 pounds even more desirable. With respect to the Aachen (ISO 2551) performance test, dimensional stability of less than +/−0.1% change may be most preferred.

Velcro rolling fuzzing resistance for loop pile (ITTS112) is a performance test known to the industry and those practiced in the art. The Velcro roller fuzzing resistance test is typically a predictor of how quickly the carpet will pill, fuzz and prematurely age over time. The test uses a small roller covered with the hook part of a hook and loop fastener. The hook material is Hook 88 from Velcro of Manchester, NH and the roller weight is 2 pounds. The hook covered wheel is rolled back and forth on the tufted carpet face with no additional pressure. The carpet is graded against a scale of 1 to 5. A rating of 5 represents no change or new carpet appearance. A rating of less than 3 typically represents unacceptable wear performance.

An additional performance/wear test includes the Hexapod drum tester (ASTM D-5252 or ISO/TR 10361 Hexapod Tumbler). This test is meant to simulate repeated foot traffic over time. It has been correlated that a 12,000 cycle count is equivalent to ten years of normal use. The test is rated on a gray scale of 1 to 5, with a rating after 12,000 cycles of 2.5=moderate, 3.0=heavy, and 3.5=severe. Usually, nylon 6,6 performs best under this test. Nylon 6 performs similarly, but slightly less resilient. Fibers such as polyester and polypropylene struggle to achieve acceptable results. Yet another performance/wear test includes the Radiant Panel Test. Some commercial tiles struggle to achieve a Class I rating, as measured by ASTM E 648-06 (average critical radiant flux >0.45=class I highest rating).

Attempts have been made by others to create single polymer carpet constructions. These include disclosures of all polyester, polyamide, and/or polypropylene carpets. It is believed that this work was driven by the need to identify a carpet construction that would have low environmental impact and easily recyclable at the end-of-life. Few of these efforts were commercialized and widely practiced due to costs and sub-standard performance issues.

Recycling of polyester ("PET") is well known in the industry. Polyester recycling options include depolymerization via methanolysis, glycolysis or hydrolysis; melting (or melt processing) and pelletizing. Typical carpet recycling efforts focus on removing individual components, such as polyamide yarn and fillers. The ability to recycle an unfilled single component carpet product will be easier and produce fewer emissions than the traditional multicomponent carpet products. Unfilled all polyester carpet products could be easily recycled into fiber, which is one of the main uses of recycled PET.

The use of recycled materials in carpet constructions is well known in the industry. The recycled materials, post-industrial or post-consumer, are used to reduce raw material costs and to minimize the impact on the environment to produce additional virgin raw materials. In some constructions, recycled materials are added as fillers. The use of many of these fillers adds to the already difficult task for recyclers to separate fiber types of the complex composites, by including the task of removing additional inorganic particulates from the comingled waste stream. The NSF 140 standard has been developed to allow for independent certification of the sustainability, recycle content, end of life, and other criteria of floorcovering articles. As such, many floorcovering articles are labeled with the amount of recycled material content they contain (post-consumer and post-industrial), and there are efforts within the industry to maximize the use of recycled raw materials.

BRIEF SUMMARY

The invention provides for a tufted carpet that meets the commercial tile performance requirements. The invention further provides for a carpet made from a single polymer family, in this case polyester. The invention provides for a tufted carpet with an ash content of less than 0.25% and a solution intrinsic viscosity ("IV") of greater than 0.50 dl/g. The invention provides for a tufted carpet that is completely recyclable without separation steps.

In one aspect, this invention relates to a polyester floor covering article comprising 100% polyester solution dyed face yarn; a polyester primary backing layer; a polyester adhesive layer; and a 100% polyester secondary backing layer in the weight range from 200 gsm to 1000 gsm, or in the weight range from 200 gsm to 850 gsm, or in the weight range from 200 gsm to 500 gsm, or in weight range from 400 gsm to 850 gsm, or even in the weight range from 400 gsm to 500 gsm.

In yet another aspect, the invention relates to a polyester floorcovering article comprised of polyester pile yarn; a spunbond nonwoven polyester primary backing layer; a first layer of polyester hot melt adhesive having a certain viscosity, wherein the hot melt adhesive is comprised of at least 50% recycled polyester material; a second layer of polyester hot melt adhesive having a viscosity or molecular weight that is three to five times higher than the viscosity of the first layer of hot melt adhesive; and a polyester needlepunch nonwoven secondary backing layer.

In a further aspect, the invention relates to a floorcovering article comprised of a layer of polyester yarn selected from the group consisting of loop pile, cut pile, or a combination of loop and cut pile; a layer of polyester primary backing layer selected from the group consisting of spunbond nonwoven, stitchbonded nonwoven, woven tape, and needlepunch nonwoven; a first layer of polyester adhesive having a certain viscosity; a second layer of polyester adhesive having viscosity at least two times greater than the viscosity of the first layer of polyester adhesive; and a layer of polyester secondary backing layer in the weight range of 200 gsm to 850 gsm.

In another aspect, the invention relates to a polyester floorcovering article comprised of a pile material comprising a combination of loop and cut polyester pile, a spunbond nonwoven polyester primary backing layer; a polyester hot melt adhesive layer; and a polyester hot melt adhesive layer with polyester filler material.

In yet another aspect, the invention relates to a polyester floorcovering article comprised of a pile material comprising a combination of polyester loop and cut pile; a spunbond nonwoven polyester primary backing layer; a polyester hot melt adhesive layer; a polyester hot melt adhesive layer with polyester filler material; and a polyester film layer.

In a further aspect, the invention relates to a polyester floorcovering article comprised of 100% polyester yarn with a weight range of 15-60 oz/yd$^2$; a polyester woven tape primary backing layer; a polyester adhesive layer having viscosity in the range from 3000 cps to 10,000 cps; and a secondary backing layer comprised of polyester.

In another aspect, the invention relates to a floorcovering article comprised of 100% polyester yarn with a weight range of 15-60 oz/yd$^2$; a spun bond nonwoven polyester primary backing layer; a first layer of polyester adhesive having a certain viscosity; a woven polyester scrim reinforcement layer; a layer of polyester adhesive having a viscosity that is from three to eight times greater than the viscosity of the first adhesive layer; and a polyester secondary backing layer.

In yet another aspect, the invention relates to a floorcovering article comprised of 100% polyester yarn with a weight range of 15-60 oz/yd$^2$; a spun bond nonwoven polyester primary backing layer; a layer of polyester adhesive having a viscosity in the range from 3000 to 10,000 cps at 350° F.; and a polyester secondary backing layer.

In yet another aspect, the invention relates to a process for recycling a floor covering article comprising substantially 100% polyester material, said process comprising the steps of: (a) providing a floorcovering article comprised of substantially 100% polyester material; (b) breaking down the floorcovering article into smaller pieces (for example, by shredding); (c) feeding the floorcovering article into an agglomerator for further size reduction; (d) heating the floorcovering article of step "c" to drive off moisture and preheat the material; (e) transferring the floorcovering article of step "d" into an extruder (such as a single or twin screw extruder) to create a polyester polymer melt; (f) subjecting the polyester melt material to vacuum pressure; (g) filtering the polyester melt material; (h) pelletizing the polyester melt material to form a pelletized polyester material; and (i) incorporating the pelletized polyester material in a new polyester-containing article. A new polyester-containing article may be selected from the group consisting of fiber, yarn, film, and articles incorporating fiber, yarn or film. A new polyester-containing article may also include thermoplastic materials.

In a further aspect, the invention relates to a depolymerization process for recycling a floor covering article comprising substantially 100% polyester material, said process comprising the steps of providing a floorcovering article comprised of substantially 100% polyester material, breaking down the floorcovering article into smaller pieces, feeding the material into a bath solution that optionally contains at least one catalyst, subjecting the material in the bath solution to heat and pressure to form polyester monomer material, polymerizing the polyester monomer material to form polyester polymer material, and incorporating the polyester polymer material in a new polyester-containing article.

In another aspect, the invention relates to a process for recycling a polyester floorcovering article comprising the steps of: (a) providing a floorcovering article comprised of substantially 100% polyester material; (b) breaking down the floorcovering article into smaller pieces; (c) feeding the smaller pieces of the floorcovering article into a plast agglomerator; (d) heating the floorcovering article by friction to just below the melting temperature of the article; (e) forcing the floorcovering article of step "d" through a die; (f) cutting the floorcovering article of step "e" into granules with a high bulk density; and (g) using the granules as a feedstock for other processes to make polyester articles.

In yet a further aspect, the invention relates to a process for recycling a polyester floorcovering article comprising the steps of providing a floorcovering article comprised of substantially 100% polyester material; marking the floorcovering article with a resin identification code according to ASTM D7611/D7611M; placing the floorcovering article in a recycle bin according to the resin identification code present on the floorcovering article; and allowing the floorcovering article to be recycled for use in new products.

In another aspect, the invention relates to a floor covering article comprised substantially of 100% polyester material, wherein the article contains an average post-consumer recycle content in the range from 70% to 100% by weight, and wherein the article is fully recyclable at the end-of-life.

BRIEF DESCRIPTION OF THE DRAWINGS

FIG. 1 is a diagram cross section of one embodiment of the single polymer floorcovering article according to the present invention.

FIG. 2 is a diagram cross section of another embodiment of the single polymer floorcovering article according to the present invention.

DETAILED DESCRIPTION

The term "floorcovering article," as used herein, is intended to describe a textile substrate which comprises face fibers and which is utilized to cover surfaces on which people are prone to walk. Thus, carpets (broadloom, tile, or otherwise) and floor mats (outdoor, indoor, and the like) are specific types of floorcovering articles.

The present invention described herein is a substantially 100% polyester floorcovering article that meets commercial tile specifications and that is fully recyclable at the end-of-life and its method of manufacture. In one aspect, the floorcovering article of the present invention is shown in FIG. 1. The floorcovering article 100 is comprised of a plurality of face yarns 110 that are tufted into a primary backing fabric 120. The face yarns 110 are held in place by an adhesive layer 130. The adhesive layer 130 also adheres a secondary backing 140 to the floorcovering article. The floorcovering article 100 is made entirely from materials in the polyester polymer family.

Specifically, the face yarn 110 is comprised of polyester polymer filaments that are twisted and heat set. The yarn is typically heat set so that the yarn will retain its twist and resiliency. Face yarn made from PET is typically less resilient than face yarn made from polyamide. Historically, PET face yarns have had lower texture appearance retention ratings (TARR) after simulated wear test, such as Hexapod (ASTM D5252 or ISO/TR 10361) or Vetterman (ASTM D5417), than polyamide face yarn. The texture appearance retention rating is an indication of how well a carpet will perform in a specific end use under typical traffic for that application. The TARR rating is dependent on the tufting construction (tufting gauge, stitches per inch, and pile height), yarn selection (denier, twist level, and heat setting condition), as well as color selection.

Surprisingly, it has been discovered that low pile heights (e.g. less than 0.25 inches) combined with high stitch density tufting constructions (e.g. density greater than 6000 oz/yd$^3$) made from high twist polyester yarns that are subsequently heat set will achieve heavy TARR rating. For example, in one instance, floorcovering articles comprised of heat set polyester face yarns having 1465/2 denier with 4.5 twists per inch may fail certain wear tests. However, floorcovering articles comprised of heat set polyester face yarns having 1465/2 denier with 6.5 twists per inch may receive a "heavy" rating in the same wear test. Accordingly, it has been found that frieze or shag carpets with pile heights 0.375" or higher will typically not perform in the same wear tests. In one aspect of the invention, a very good performing product had a tufted pile height of 0.125", which shrank to 0.094" after heat setting. The initial pile density was 8064 oz/yd$^3$. The finished pile density was over 10,752 oz/yd$^3$.

The yarn may be dyed or undyed. If the yarn is dyed, it may be solution dyed. Polyester yarn is well known in the industry, and one commercially available supplier is Pharr Yarns of McAdenville, NC. The face weight of the yarn, pile height, and density will vary depending on the desired aesthetics and performance requirements of the end-use floorcovering article. In one aspect, a 1465/2 semi dull solution dyed PET yarn may be utilized as the face yarn.

The primary backing can be any suitable primary backing. The preferred embodiment uses a nonwoven polyester spunbond. In one aspect, the polyester spunbond backing is Lutradur® from Freudenberg Nonwovens of Weinheim, Germany. In another aspect, flat woven polyester tapes, such as Isis™ from Propex of Chattanooga, TN, may be utilized. If needed, a primary backing made of a woven tape with either staple fibers or nonwoven fabrics affixed can be used. Also stitch bonded and knitted polyester fabrics may be used.

The composite material that includes the yarns tufted into the primary backing may be heat stabilized to prevent dimensional changes from occurring in the finished carpet tile. The heat stabilizing or heat setting process typically involves applying heat to the material that is above the glass transition temperature, but below the melting temperature of the components. The heat allows the polymer components to release internal tensions and allows improvement in the internal structural order of the polymer chains. The heat stabilizing process can be carried out under tension or in a relaxed state. The tufted composite material is typically also stabilized to allow for the yarn and primary backing to shrink prior to the tile manufacturing process. Heat stabilization further aids in preventing the edges of the finished tile from curling. Dimensional stability may be measured using the Aachen Test (ISO 2551).

The adhesive layer 130 may be composed of a monolithic adhesive polymer or multiple layers of adhesive polymers. In one aspect, the adhesive has sufficient viscosity to be able to flow and penetrate the yarn bundle, as well as to secure the yarn tufts to the primary backing. It has been discovered that if the viscosity of the adhesive layer is too high the adhesive may act to secure the yarn to the primary backing, but may fail to lock the individual filaments of the yarn in place. Lack of adhesive penetration into the yarn bundle will result in poor Velcro roller fuzzing resistance (ITTS 112). Conversely, if the viscosity of the adhesive layer is too low, the adhesive may wet out the yarn and primary backing, migrate up the yarn stalk to the face side of the floorcovering article, and flow around the yarn bundle through the tuft holes and onto the top of the primary backing. When this occurs, the floorcovering article will exhibit a harsh plastic hand and detract from the aesthetics of the article.

Thus, in one aspect, the monolithic polyester adhesive layer 130 may exhibit a viscosity in the range from 2000 to 80,000 cps at 350° F., or in the range from 3000 to 20,000 cps at 350° F., or in the range from 3000 to 10,000 cps at 350° F., or in the range from 3000 to 6000 cps at 350° F., or in the range from 3500 to 5000 cps at 350° F. If the viscosity is outside this range, the adhesive layer may not penetrate the yarn bundle or it may wick up the yarn stalk. The polyester adhesive layer 130 in this viscosity range will predominately wet out the tufted back stitch and primary backing. It is desirable to allow sufficient adhesive polymer to remain on the surface to aid in adhering the secondary backing to the floorcovering article.

In one aspect, the adhesive is a hot melt adhesive polymer applied in film form. The adhesive layer is typically present in the floorcovering article in a weight range of from 7 oz/yd$^2$ to 25 oz/yd$^2$. The select adhesive of the present invention aids in providing a Velcro roller fuzzing performance of greater than 3 in the finished carpet tile.

While temperature and pressure may be used to control the penetration of the adhesive polymer in the carpet coating process, there may be limitations on their use. The ability to use temperature in the coating process is limited by the other polyester substrates (primary carpet backing) and the need to minimize degradation to the polymer. In one aspect, the polymer is applied at a temperature that will not melt the polyester primary backing. The ability to use pressure in the coating process is also limited by the need to minimize crushing of the polyester pile. Pressure may cause the polymer to penetrate and flow into the tufted primary backing. The path taken by the adhesive polymer is typically the one of least resistance, which may result in the polymer flowing around the yarn bundle through the openings in the primary backing left from the tufting needles. The presence of the adhesive polymer in the yarn bundle aids in locking in the individual filaments within the bundle and preventing pull out.

The penetration of the adhesive into the yarn bundle is important to the wear performance of the carpet. Surprisingly, the application of heat at temperatures above the adhesive softening temperature, but below the heat set temperature of the tufted carpet, will allow for improved adhesive penetration into the yarn bundle. The penetration is enhanced further when the coated carpet is oriented so that the pile surface is below the coated back side of the carpet during the heat soaking process.

As shown in FIG. 2, floorcovering article 200 may be comprised of face fiber 210, primary backing 220, adhesive layers 231 and 232, and secondary backing 240, as similarly described previously for FIG. 1. Thus, floorcovering article 200 may be comprised of multiple layers of adhesive polymer. For example, as illustrated in FIG. 2, floorcovering article 200 includes adhesive layers 231 and 232.

In one aspect, the viscosity of adhesive layer 232 is greater than the viscosity of adhesive layer 231. More specifically, the viscosity of adhesive layer 232 is at least 3 times greater than the viscosity of adhesive layer 231. In another aspect, the viscosity of adhesive layer 232 may be from 2 to 10 times, from 2 to 8 times, from 2 to 5 times, or from 3 to 5 times greater than the viscosity of adhesive layer 231. Having differentiation of viscosity between the adhesive polymer layers reduces, or prevents, the adhesive polymer from wicking too far into the tufted backstitch rows and primary backing layer (towards the face yarns). It is desirable that some of the adhesive polymer remains on the surface to bond with the secondary backing layer. The polyester material comprising a second layer of adhesive may be the same as the polyester material comprising the first layer, or it may be different.

The secondary backing layer 140 and 240 may be heat set or otherwise stabilized by techniques know to those skilled in the art. Inadequate stabilization may result in excessive dimensional changes (Aachen Test) or edge curling of the finished carpet tiles. The secondary backing layer may be comprised of needle punch nonwoven materials made from continuous or staple fiber, spunbond nonwoven materials, stitchbonded fabrics, hydroentangled nonwovens made from continuous or staple fibers, biaxially oriented polyester films, polyester spunbonded nonwovens, polyester stitch bonded nonwovens, polyester needlepunched nonwovens, polyester hydroentangled nonwovens, polyester carded nonwovens or thermally bonded nonwovens. If the secondary backing layer is a film, the film may have a thickness of 1 mil to 10 mils. In one aspect, a floorcovering article according to the present invention may be made without a secondary backing layer.

The tufted primary composite material (face yarns and primary backing layer) is typically heat stabilized in a steamer using moisture and heat to preshrink the yarn and primary backing layer. Topical chemical treatments may then optionally be applied via a foamer. The floorcovering article is then dried. The adhesive layer is applied to the stabilized tufted primary composite material. The adhesive may be applied in the melted state by a three roll coater. The adhesive may be applied by extrusion coating (melt), scatter coating (powder), lamination (film), knife over bed (dispersion), or other methods known to the industry. The adhesive layer may be applied in an aqueous form or as a film. If the adhesive is applied as a monolithic layer, the secondary backing may be bonded to the coated floorcovering article at this time. The adhesive coated floorcovering article is heat soaked to re-melt the adhesive and to allow the adhesive to flow and penetrate the yarn bundle in the back stitch. If the adhesive is applied in multiple layers, a second coating is applied by a three roll coater or other methods described above. The heat stabilized secondary backing layer is applied during the second coating step. The coated and laminated floorcovering article may then be cut into individual carpet tiles.

The polyester adhesive polymer may be comprised of material having at least 50% recycled polyester content by weight. In another aspect, the polyester adhesive polymer may be comprised of material having at least 65% recycled polyester content by weight. In another aspect, the polyester adhesive polymer may be comprised of recycled polyester content in the range from 50% to 80% by weight.

One of the main uses of recycled polyester material is to make polyester staple fiber that is used in nonwovens, fiberfill, etc. The fiber spinning process involves extruding polymer through small orifices within a die. The small diameter of the fibers produced requires that the polymer melt is filtered to remove particular matter, in some cases particles greater than 43 microns need to be removed. The polyester fiber spinning applications typically require that the adhesive be free from inorganic particular matter or fillers.

A novel approach is to add polyester fillers to the adhesive layer. The low melting temperature and low viscosity of the adhesive will allow for PET filler to be added to the adhesive. The adhesive processing temperatures are such that the PET filler is typically not melted. The incorporation of the polymer filler as an unmelted solid in the adhesive layer will add rigidity and stiffness to the floorcovering article. The polyester filler may be present in the adhesive polymer in the range of 10% to 50% by weight. Alternatively, the adhesive polymer may be free from filler materials.

The selection of the filler may impact the end-of-life customers, with respect to the intrinsic viscosity ("IV") of the PET floorcovering article. For example, the use of PET that has a solution IV of less than 0.50 dl/g will reduce the overall solution IV of the carpet composite. The use of PET that has a solution IV of greater than 1.0 dl/g will raise the overall carpet composite IV, but the high IV PET may not melt in the end-of-life processors equipment. The desired IV of the filler is in the range of 0.50 to 0.80 dl/g. PET filler in this range will melt in the typical PET range, and there will be some transesterification of the lower IV and higher IV materials during melt processing. Intrinsic viscosity may be measured according to ASTM D4603. The polymer filler should have a particle size in the range of 60 to 140 mesh. Polymer filler with larger particle size will cause drag marks and other processing problems when applying the adhesive to the carpet. A possible source of PET fillers is "fines" from PET bottle washing plants that occur during chip handling.

The floorcovering article of the present invention may be dyed or printed by techniques known to those skilled in the art. Printing inks will contain at least one dye. Dyes may be selected from acid dyes, direct dyes, reactive dyes, cationic dyes, disperse dyes, and mixtures thereof. Acid dyes include azo, anthraquinone, triphenyl methane and xanthine types. Direct dyes include azo, stilbene, thiazole, dioxsazine and phthalocyanine types. Reactive dyes include azo, anthraquinone and phthalocyanine types. Cationic dyes include thiazole, methane, cyanine, quinolone, xanthene, azine, and triaryl methine. Disperse dyes include azo, anthraquinone, nitrodiphenylamine, naphthal imide, naphthoquinone imide and methane, triarylmethine and quinoline types.

As is known in the textile printing art, specific dye selection depends upon the type of fiber and/or fibers comprising the textile substrate that is being printed. For example, in general, a disperse dye may be used to print polyester fibers. Alternatively, for materials made from cationic dyeable polyester fiber, cationic dyes may be used.

The printing process of the present invention uses a jet dyeing machine, or a digital printing machine, to place printing ink on the surface of the textile substrate (such as a carpet tile) in predetermined locations. One suitable and commercially available digital printing machine is the Millitron® digital printing machine, available from Milliken & Company of Spartanburg, South Carolina. The Millitron® machine uses an array of jets with continuous streams of dye liquor that can be deflected by a controlled air jet. The array of jets, or gun bars, is typically stationary. Another suitable and commercially available digital printing machine is the Chromojet® carpet printing machine, available from Zimmer Machinery Corporation of Spartanburg, South Carolina. In one aspect, a tufted carpet made according to the processes disclosed in U.S. Pat. Nos. 7,678,159 and 7,846,214, both to Weiner, may be printed with a jet dyeing apparatus as described and exemplified herein.

Viscosity modifiers may be included in the printing ink compositions. Suitable viscosity modifiers that may be utilized include known natural water-soluble polymers such as polysaccharides, such as starch substances derived from corn and wheat, gum arabic, locust bean gum, tragacanth gum, guar gum, guar flour, polygalactomannan gum, xanthan, alginates, and a tamarind seed; protein substances such as gelatin and casein; tannin substances; and lignin substances. Examples of the water-soluble polymer further include synthetic polymers such as known polyvinyl alcohol compounds and polyethylene oxide compounds. Mixtures of the aforementioned viscosity modifiers may also be used. The polymer viscosity is measured at elevated temperatures when the polymer is in the molten state. For example, viscosity may be measured in units of centipoise at elevated temperatures, using a Brookfield Thermosel unit from Brookfield Engineering Laboratories of Middleboro, MA. Alternatively, polymer viscosity may be measured by using a parallel plate rheometer, such as made by Haake from Rheology Services of Victoria Australia.

The floorcovering article of the present invention may be exposed to post treatment steps. For example, chemical treatments such as stain release, stain block, antimicrobial resistance, bleach resistance, and the like, may be added to the recyclable, single polymer floorcovering article. Mechanical post treatments may include cutting, shearing, and/or napping the surface of the floorcovering article.

With respect to stain treatment specifically, since polyester and polyester carpet fibers have a natural affinity for oily substances, the buildup of oily substances on the carpet face may detract from the appearance of the carpet. The natural affinity of polyester for oily substances may make cleaning and maintenance of the carpet difficult. One embodiment of the invention applies high molecular weight ethoxylated polyester to the carpet face. One possible source of the ethoxylated polyester is Lubril QCX from Momentive Performance Materials Holdings LLC of Columbus, OH. The ethoxylated polyester treatment may minimize staining and improve the ability of the carpet to release stains during cleaning.

The recyclable, single polymer floorcovering articles of the present invention includes, without limitation, woven carpet, knitted carpet, tufted carpet, graphics tufted carpet, stitched on pile carpet, bonded pile carpet, hooked carpet, knotted pile carpet, and the like. The floorcovering article may be broadloom carpet or carpet tiles. The floorcovering articles may be of any suitable construction (e.g. hardback, cushion back, etc.). The face may be constructed of any appropriate textile material in yarn or pile form that is suitable for dyeing and patterning, and may have a face height or pile height that is uniform or non-uniform (e.g. may be textured, as found in a multi-level loop pile) created by tufting, needling, flocking, bonding, and the like, or the use of non-woven substrates. Details of floorcovering constructions, including hardback floorcovering articles, are described in WO 03/106751 A1.

The face yarns are comprised of polyester material. Examples of polyester materials include aromatic polyesters, such as polyethylene terephthalate (PET), polybutylene terephthalate (PBT), polytrimethylene terephthalate (PTT), and polytriphenylene terephthalate, and aliphatic polyesters, such as polylactic acid (PLA), and combinations thereof.

The polyester materials of the present invention may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof. Accordingly, the floorcovering article will generally be comprised of layers of materials comprising interlaced fibers, interlaced yarns, loops, or combinations thereof.

The selection of the individual carpet components (yarn, primary backing, adhesive, and secondary backing) may impact the end of life customers with respect to the intrinsic viscosity of the PET floorcovering article. The intrinsic viscosity of the yarn, primary backing, and secondary backing should be as high as possible with the ideal materials having an intrinsic viscosity between 0.50 dl/g and 0.80 dl/g. The use of components with intrinsic viscosity less than 0.50 dl/g will reduce the overall intrinsic viscosity of the total floorcovering article. Floor covering articles made from components of lower intrinsic viscosity will produce recycled raw materials with lower intrinsic viscosity. The recycled raw materials with lower intrinsic viscosity will have less value as potential raw materials and fewer potential uses. The selection of the components should also consider potential chemical and polymer contamination. For example, materials such as polyvinyl chloride and halogenated chemicals will cause degradation of the polyester polymer during the end of life melt processing, In FIGS. 1 and 2, the face yarns are illustrated in a loop pile construction. Of course, it is to be understood that other face yarn constructions including cut pile constructions and combinations of loop pile and cut pile may likewise be used.

The textile substrate may be comprised of fibers or yarns of any size, including microdenier fibers or yarns (fibers or yarns having less than one denier per filament). The fibers or yarns may have deniers that range from less than about 0.1 denier per filament to about 2000 denier per filament or, more preferably, from less than about 1 denier per filament to about 500 denier per filament.

Additionally, the fibers comprising the floorcovering article may include additives coextruded therein, may be precoated with any number of different materials, including those listed in greater detail below, and/or may be dyed or colored to provide other aesthetic features for the end user with any type of colorant, such as, for example, poly (oxyalkylenated) colorants, as well as pigments, dyes, tints, and the like. Other additives may also be present on and/or within the target fiber or yarn, including antistatic agents, brightening compounds, nucleating agents, antioxidants, UV stabilizers, fillers, permanent press finishes, softeners, lubricants, curing accelerators, and the like.

Floorcovering articles may have a fiber face weight in the range from about 1 to about 75 ounces/square yard, or in the range from about 5 to about 60 ounces/square yard, or in the range from about 10 to about 55 ounces/square yard, or in the range from about 15 to about 50 ounces/square yard. The layers of the floorcovering article may comprise, on average, from 70 to 100% of polyester post-content. Specifically, the layer of face yarn may be comprised of polyester post-consumer content (i.e. recycled material) in the range from 70% to 100% by weight. The primary backing layer may be comprised of polyester post-consumer content in the range from 70% to 100% by weight. One or more of the adhesive layers may be comprised of polyester post-consumer content in the range from 70% to 100% by weight. The secondary backing layer may be comprised of polyester post-consumer content in the range from 70% to 100% by weight.

In modular carpet tile installation, adhesives may be used to hold the tiles to the floor. These adhesive are typically polyolefin based or SBR latex based. The installation adhesives will leave residue on the back side of the all polyester tile that will contaminate the tile and may cause processing issues for the end-of-life customers. Thus, a polyester-based installation adhesive may be made using the polyester hot melt adhesives blended with a plasticizer and/or tackifier. The polyester adhesive may be Avox ARP-40 from Ulterion International of Taylors, SC and the plasticizer may be a functionalized polyethylene glycol. Such an adhesive will eliminate, or greatly reduce, contamination that may be caused from a non-polyester based adhesive material used in modular carpet tile installation. The polyester-based installation adhesive also provides a high friction coating that prevents lateral movement of the installed floorcovering article. Lab trials evaluating chemicals to modify polyester adhesive viscosity have produced a very tacky substance that could be used as an installation adhesive. The lab trials used ARP—40 mixed with 30 to 50% Uniplex 809 available from Unitex Chemical of Greensboro, NC.

EXAMPLES

The invention may be further understood by reference to the following examples which are not to be construed as limiting the scope of the present invention.

Test Procedures

Viscosity Determination:

Unless otherwise indicated, viscosity was measured using a Brookfield Thermosel unit available from Brookfield Laboratories, Middleboro, MA, operating at 60 rpm using a #27 spindle.

Velcro Roller Fuzzing Test ITTS 112:

The sample was subjected to the cycling action of a two-pound roller with #88 Velcro hook attached. The roller was rolled forward in the long direction of the specimen and pulled to return to the starting position without applying any extra pressure to the roller. The forward and backward stroke was considered one cycle. Cycling was repeated in sets of five (5) up to twenty-five (25) strokes. The Key to Rating was as follows:

5=Negligible or no fuzzing
4=Slight fuzzing
3=Noticeable fuzzing
2=Considerable fuzzing
1=Severe fuzzing.

The Standard Test Method for Tuft Bind of Pile Yarn Floor Coverings ASTM D1355-05 was used to determine tuft strength of the floorcovering article of the present invention.

The Standard Test Method for Resistance to Delamination of the Secondary Backing of Pile Yarn Floor Covering ASTM D3936-02 was used to determine delamination resistance of the floorcovering article of the present invention.

The Standard Practice for Coding Plastic Manufactured Articles for Resin Identification ASTM D7611/D7611 M-10 was used to determine code identification and recyclability of the floorcovering articles of the present invention.

Example 1

A floorcovering article comprised substantially of 100% polyester material was prepared as follows:

A base substrate was constructed of 40 oz/yd$^2$ tufted polyester loop carpet containing a combination of semi-dull and bright yarns. The yarns were tufted through a 130 gsm polyester nonwoven primary backing layer from Freudenberg. The semi-dull yarn was 55% of the tufted face weight and the bright yarn was 45% of the tufted face weight. The yarns were arranged in alternating rows. The semi-dull yarn was a 2 ply, 2 ends per tufting needle, available from Pharr. The bright yarn was a 2 ply, 2 ends per tufting needle, available from Pharr. All yarn was in an undyed state. However, it should be noted that solution dyed yarn may optionally be used.

The tufted primary backing was scatter coated with EMS Griltex D1539 copolyester hot melt adhesive powder (melt viscosity of 100,000 cps at 160° C. measured per ISO 1133) from EMS Chemie of Domat, Switzerland. 5.8 oz/yd$^2$ of adhesive was applied using a scatter (powder) coater. The sample was placed under an infrared ("IR") heater to sinter the adhesive, and a nonwoven PET secondary backing was laminated to the coated carpet. The carpet composite had good delamination resistance (greater than 8 lbs) and good tuft bind (greater than 8 lbs). The Velcro roller fuzzing resistance was less than 2.

Example 2

The tufted primary backing used in Example 1 was scatter coated with EMS Griltex D1539 copolyester hot melt adhesive powder. 10 oz/yd$^2$ of adhesive was applied. The sample was placed under an IR heater to sinter the adhesive. The carpet composite had good tuft bind (greater than 8 lbs). The Velcro roller fuzzing resistance was less than 2.

Example 3

The tufted primary backing of Example 1 was scatter coated with EMS Griltex D1539 copolyester hot melt adhesive powder. 16 oz/yd$^2$ of adhesive was applied. The sample was placed under an IR heater to sinter the adhesive. The carpet composite had good tuft bind (greater than 8 lbs). The Velcro roller fuzzing resistance was 2.

Example 4

The tufted primary backing of Example 1 was scatter coated with EMS Griltex D1539 copolyester hot melt adhesive powder. 5.3 oz/yd$^2$ of adhesive was applied. The sample was placed under an IR heater to sinter the adhesive. An additional 5.3 oz/yd$^2$ of adhesive was applied, and the adhesive was sintered. An additional 5.3 oz/yd$^2$ of adhesive was applied; the adhesive was sintered; and a nonwoven PET secondary backing was laminated to the coated carpet. The carpet composite had good delamination resistance (8 lbs) and good tuft bind (greater than 8 lbs). The Velcro roller fuzzing resistance was 2.

Example 5

The tufted primary backing of Example 1 was scatter coated with EMS Griltex D1539 copolyester hot melt adhesive powder. 16 oz/yd$^2$ of adhesive was applied. The sample was placed under an IR heater to sinter the adhesive, and the same nonwoven PET secondary backing of Example 1 was laminated to the coated carpet. The carpet composite was placed face down in an oven and heat soaked. The carpet had good delamination resistance (greater than 8 lbs) and good tuft bind (greater than 8 lbs). The Velcro roller fuzzing resistance was less than 2.

Example 6

The tufted primary backing of Example 1 was scatter coated with EMS Griltex D1582 copolyester hot melt adhesive powder (melt viscosity of 130,000 cps at 160° C. measured per ISO 1133). 16 oz/yd$^2$ of adhesive was applied. The sample was placed under an IR heater to sinter the adhesive. The carpet composite was placed face down in an oven and heat soaked for 2 minutes at 330° F. The Velcro roller fuzzing resistance was 2.

Example 7

The tufted primary backing of Example 1 was coated with a film made from Skybon EH100 copolyester hot melt adhesive (melt flow rate of 37 g/10 min at 160° C.) from SK Chemicals of Gyeonggi-Do, Korea. 20 oz/yd$^2$ of adhesive was applied. The sample was placed under an IR heater to sinter the adhesive, and the same nonwoven PET secondary backing of Example 1 was laminated to the coated carpet. The carpet composite was placed face down in an oven and heat soaked. The Velcro roller fuzzing resistance was 2.

Example 8

The tufted primary backing of Example 1 was coated with a film made from Dynacoll S1401 copolyester hot melt adhesive (melt viscosity of 110,000 cps at 160° C. ISO 3219) from Evonik of Essen, Germany. 20 oz/yd$^2$ of adhesive was applied. The sample was placed under an IR heater to sinter the adhesive, and the nonwoven PET secondary backing of Example 1 was laminated to the coated carpet. The carpet composite was placed face down in an oven and heat soaked. The Velcro roller fuzzing resistance was 2.

Example 9

The tufted primary backing of Example 1 was coated with a film made from Dynacoll S1402 copolyester hot melt adhesive (melt viscosity of 100,000 cps at 160° C. ISO 3219). 20 oz/yd$^2$ of adhesive was applied. The sample was placed under an IR heater to sinter the adhesive, and the nonwoven PET secondary backing of Example 1 was laminated to the coated carpet. The carpet composite was placed face down in an oven and heat soaked. The Velcro roller fuzzing resistance was 2.

Example 10

The tufted primary backing of Example 1 was coated with a film made from Dynacoll S341 copolyester hot melt adhesive (melt viscosity of 20,000 cps at 180° C. ISO 3219. 20 oz/yd$^2$ of adhesive was applied. The sample was placed under an IR heater to sinter the adhesive, and the nonwoven PET secondary backing of Example 1 was laminated to the coated carpet. The carpet composite was placed face down in an oven and heat soaked. The Velcro roller fuzzing resistance was 3. The edges of the carpet composite exhibited severe curling. Without being bound by theory, this is believed to be due to the crystallinity of the adhesive.

Example 11

The tufted primary backing of Example 1 was coated with a film made from Bostik HM 4186 copolyester hot melt adhesive (melt viscosity of 140,000 cps at 180° C.) from Bostik of Middleton, MA. 20 oz/yd$^2$ of adhesive was applied. The sample was placed under an IR heater to sinter the adhesive, and the nonwoven PET secondary backing of Example 1 was laminated to the coated carpet. The carpet composite was placed face down in an oven and heat soaked. The Velcro roller fuzzing resistance was 2.

Example 12

The tufted primary backing of Example 1 was coated with a film made from a 50:50 blend of Skybon EH100 and EMS Griltex D1539 copolyester hot melt adhesives. 20 oz/yd² of adhesive was applied. The sample was placed under an IR heater to sinter the adhesive. The carpet composite was placed face down in an oven and heat soaked. The Velcro roller fuzzing resistance was 2.

Example 13

The tufted primary backing of Example 1 was coated with a film made from a 90:10 blend of Skybon EH100 hot melt adhesive and Uniplex 809 plasticizer. 20 oz/yd² of adhesive was applied. The sample was placed under an IR heater to sinter the adhesive, and the nonwoven PET secondary backing of Example 1 was laminated to the coated carpet. The carpet composite was placed face down in an oven and heat soaked. The Velcro roller fuzzing resistance was 2.

Example 14

The tufted primary backing of Example 1 was coated with a film made from an 80:20 blend of Skybon EH100 hot melt adhesive and Dynacoll S341 hot melt adhesive. 20 oz/yd² of adhesive was applied. The sample was placed under an IR heater to sinter the adhesive, and the nonwoven PET secondary backing of Example 1 was laminated to the coated carpet. The carpet composite was placed face down in an oven and heat soaked. The Velcro roller fuzzing resistance was 2.

Example 15

The tufted primary backing of Example 1 was coated with a film made from a 90:10 blend of Skybon EH100 hot melt adhesive and non-polyester polar wax. 20 oz/yd² of adhesive was applied. The sample was placed under an IR heater to sinter the adhesive, and the nonwoven PET secondary backing of Example 1 was laminated to the coated carpet. The carpet composite was placed face down in an oven and heat soaked. The Velcro roller fuzzing resistance was 2.

Example 16

The tufted primary backing of Example 1 was coated with a film made from Avox ARP-40 hot melt adhesive with a melt viscosity of 2100 cps at 150° C. 20 oz/yd² of adhesive was applied. The sample was placed under an IR heater to sinter the adhesive. The carpet composite was placed face down in an oven and heat soaked. The adhesive migrated up the yarn stalk and plasticized the fiber. The carpet had a very harsh hand and poor appearance.

Example 17

The tufted primary backing of Example 1 was coated with a film made from Avox ARP-40 hot melt adhesive with a melt viscosity of 4200 cps at 150° C. 20 oz/yd² of adhesive was applied. The sample was placed under an IR heater to sinter the adhesive. The carpet composite was placed face down in an oven and heat soaked. The Velcro roller fuzzing resistance was 4. The adhesive migrated into the yarn bundle on the rear side of the primary backing. There was no visual evidence of the adhesive migrating up the yarn stalk.

Example 18

The tufted primary backing of Example 1 was coated with a film made from Avox ARP-40 hot melt adhesive with a melt viscosity of 4200 cps at 150° C. 20 oz/yd² of adhesive was applied. The sample was placed under an IR heater to sinter the adhesive. The carpet composite was placed face down in an oven and heat soaked. The carpet composite was reheated and the secondary backing of Example was laminated thereto. The Velcro roller fuzzing resistance was 4. There was not adequate adhesive left on the back side of the composite to bond it to the nonwoven secondary backing (no bond was formed).

Example 19

The tufted primary backing of Example 1 was coated with Avox ARP-40 hot melt adhesive. 35 oz/yd² of adhesive was applied. The nonwoven secondary backing of Example 1 was laminated thereto. The adhesive migrated into the yarn bundle and there was not adequate adhesive left on the back side of the carpet composite to bond to the nonwoven secondary backing (no bond was formed).

Example 20

The tufted primary backing of Example 1 was coated with Avox ARP-40 hot melt adhesive. 20 oz/yd² of adhesive was applied. The carpet composite is placed face down in an oven and heat soaked. A second coating of the ARP-40 hot melt adhesive was applied at 20 oz/yd². The nonwoven secondary backing of Example 1 was laminated thereto. The adhesive migrated into the yarn bundle, and there was not adequate adhesive left on the back side to bond to the nonwoven secondary backing (no bond was formed).

Example 21

A floor covering article comprised substantially of 100% polyester materials was prepared as follows:

A base substrate was constructed of 28 oz/yd² tufted polyester loop carpet containing a combination of solution dyed yarns of different colors. The yarns were tufted through a 130 gsm polyester nonwoven primary backing layer. The solution dyed yarn had a 6.5 twist per inch and was heat set.

The tufted primary backing layer was coated with a film made from Avox ARP-40 hot melt adhesive. 20 oz/yd² of adhesive was applied. The carpet composite was placed face down in an oven and heat soaked. A coating of Avox ARP-200 was applied and a secondary backing of Example 1 was laminated thereto. The Velcro roller fuzzing resistance was 4. The appearance retention was rated as heavy. The delamination resistance was 26 lbs., and the tuft bind was 16.5 lbs. Accordingly, the polyester floorcovering article of the present invention may exhibit a Resistance to Delamination value of greater than 8 pounds, or of greater than 10 pounds, or of greater than 12 pounds, or of greater than 15 pounds, or of greater than 20 pounds, or of greater than 25 pounds.

Thus, in one embodiment, the invention as described herein includes a floorcovering article made by tufting comprising the following:

Layer #1: 100% polyester, solution dyed yarn tufted through primary backing;

Layer #2: spunbond nonwoven polyester primary backing layer;

Layer #3: polyester hot melt adhesive with a melt viscosity of 4200 cps at 350° F.; wherein the adhesive layer is in the weight range of 7 oz/yd² to 25 oz/yd²;

Layer #4: 100% polyester heat set staple fiber needlepunch nonwoven secondary backing layer in the weight range of 200 gsm to 1000 gsm.

The tufted floorcovering article is completely recyclable with a solution IV >0.50 dl/g as per ASTM D4603 and ash content <0.25% as per ASTM D5630. The tufted carpet exhibits the following commercial performance properties:

Velcro roller fuzzing value of greater than 3 as per ITTS 112;

Delamination test value of greater than 8 lbs., or even greater than 10 lbs., as per ASTM D3936; and Aachen dimensional stability of less than +/−0.1% change as per ISO 2551.

The tufted floor covering article may comprise more than one layer of adhesive polymer. For example the following adhesive polymer layers may be utilized:

Layer #3A: polyester hot melt adhesive with a melt viscosity of 4200 cps at 350° F. (Avox ARP-40 made of 65% recycled material); and Layer #3B: polyester hot melt adhesive having a viscosity/molecular weight that is 3-5 times higher than layer #3A;

the polyester material of Layer #3B may be the same or different than the polyester material of Layer #3A.

The polyester yarn may be loop pile, cut pile, or combinations of loop and cut pile. The yarn may be bulked continuous filament ("BCF") yarn. The primary backing of the tufted floorcovering article may comprise polyester spunbond, polyester woven tape, polyester stitch bonded fabric, or polyester knitted fabric. A polyester filler may be incorporated into the adhesive Layer #3. The filler may be in the weight range of 10% to 50% of the adhesive layer.

In one alternative embodiment, a biaxially oriented PET film may be used in place of the secondary backing layer. The film may have a thickness in the range from 1 to 10 mils. In yet another embodiment, a woven pet scrim reinforcement (knit of woven) may be laminated into the adhesive layer.

Further, the invention as described herein includes a floorcovering article made from all polyester components that is recycled by melt processing. The floorcovering articles (such as carpet tiles) are shredded and fed into an agglomerator for further size reduction. The shredded material is then exposed to a preheating step which results in moisture removal. The material is then fed into an extruder where the polymer melt is subject to high vacuum and melt filtration. The polymer melt is then pelletized. The polyester pellets can be used to make various polyester articles, such as staple fiber and nonwoven materials.

Further, the invention as described herein includes a floorcovering article made from all polyester components that is recycled by melt processing. The floorcovering articles (such as carpet tiles) are shredded, fed into a twin screw extruder, processed under vacuum to remove moisture, and pelletized. The polyester pellets can be used to make various polyester articles, such as staple fiber and nonwoven materials.

Further, the invention as described herein includes a floorcovering article made from all polyester components that is recycled by melt processing. The floorcovering articles (such as carpet tiles) are shredded and fed into an agglomerator for further size reduction. The shredded material is then exposed to a preheating step which results in moisture removal. The material is then fed into an extruder where the polymer melt is subject to high vacuum and melt filtration. The polymer melt is then pelletized. The pellets are further processed in a reactor under heat and high vacuum to solid state polymerize the pellets and increase the molecular weight and intrinsic viscosity of the pellets. The polyester pellets can be used to make various polyester articles, such as staple fiber and nonwoven materials.

In yet another embodiment, the invention as described herein includes a floorcovering article made from all polyester components that is recycled by depolymerization. The floorcovering articles (such as carpet tiles) are shredded and fed into a reactor for depolymerization via methanolysis, glycolysis, or hydrolysis. The monomer thus created can be used as feedstock to make polyester polymer.

In a further embodiment, the invention as described herein includes a floorcovering article made from all polyester components that is recycled by melt processing. The floorcovering articles (such as carpet tiles) are shredded and densified or plast-agglomerated. The plast-agglomeration process involves heating the polymer using friction to a point just below the polymer melting temperature. The heated polymer is forced through a die and cut to form free-flowing particles with a high bulk density. The plast-agglomerated material is fed into a melt process and used to make various polyester articles.

Additionally, the invention as described herein includes a floorcovering article that is made from all polyester components that has a post-consumer recycle ("PCR") content in the range from 70% to 100% by weight, and at the end-of-life is fully recyclable. The use of components made from post-consumer recycled goods will minimize the product carbon footprint and reduce the impact on the environment. Specifically, the PET face yarn will be made with up to 100% PCR PET; the primary backing layer will be made with up to 100% PCR PET; the adhesive(s) will be made with up to 70% PCR PET; and the secondary backing layer (such as felt) will be made from up to 100% PCR PET.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A polyester-containing article formed from pelletized polyester polymer, wherein the pelletized polyester polymer originated from floorcovering articles comprising 100% polyester material, wherein the 100% polyester material includes a plurality of face yarns tufted into a primary backing fabric held in place by an adhesive layer that further adheres a secondary backing to the floorcovering articles.

2. The polyester-containing article of claim 1, wherein the polyester-containing article is polyester fiber.

3. The polyester-containing article of claim 2, wherein the polyester fiber is polyester staple fiber.

4. The polyester-containing article of claim 1, wherein the article comprises recycled polyester floorcovering articles.

5. Polyester staple fiber formed from recycled 100% polyester-containing floorcovering articles, wherein the 100% polyester-containing floorcovering articles include a plurality of face yarns tufted into a primary backing fabric held in place by an adhesive layer that further adheres a secondary backing to the floorcovering articles.

6. The polyester staple fiber of claim 5, wherein the floorcovering articles are free from filler materials.

7. The polyester staple fiber of claim 5, wherein the polyester staple fiber is free from filler materials.

* * * * *